United States Patent Office 3,753,921
Patented Aug. 21, 1973

3,753,921
NOVEL DAYLIGHT FLUORESCENT PIGMENTS AND PROCESS FOR PREPARING THEM
Siegfried Noetzel, Mainz, and Edgar Fischer, Frankfurt am Main, Germany, assignors to Farbwerke Hoechst Aktiengesellschaft vormals Meister Lucius & Bruning, Frankfurt am Main, Germany
No Drawing. Filed Jan. 31, 1972, Ser. No. 222,306
Claims priority, application Germany, Feb. 2, 1971,
P 21 04 719.8
Int. Cl. C09k 1/02
U.S. Cl. 252—301.2 R         7 Claims

ABSTRACT OF THE DISCLOSURE

New daylight fluorescent pigments which contain an organic fluorescent dyestuff and as resin a condensation resin, consisting of copolymerizates of olefinically unsaturated compounds containing epoxy groups and hence copolymerizable vinyl compounds which are cross-linked with di- or polycarboxylic acids or the anhydrides thereof and a process for their preparation which comprises incorporating the organic fluorescent dyestuff into the condensation resin.

These daylight fluorescent pigments may be employed for preparing fluorescent paints, for example air-drying lacquers on the basis of alkyl resin or physically drying lacquers on the basis of acrylic resins, as well as for preparing fluorescent printing inks such as inks for screen printing, intaglio printing, book printing and offset-litho printing.

Due to their high resistance to heat, they are particularly suitable for fluorescent dyeing of plastics and enamels.

---

The present invention relates to novel daylight fluorescent pigments which contain an organic fluorescent dyestuff and as a base resin a cross-linked polyester resin consisting of copolymers of olefinically unsaturated compounds that contain epoxy groups and hence copolymerizable vinyl compounds which are cross-linked with di- or polycarboxylic acids or anhydrides thereof.

This invention also relates to a process for preparing these pigments, which comprises incorporating the fluorescent dyestuff in the base resin.

As olefinically unsaturated compounds containing epoxy groups the following monomers may be used, for example: (Meth)acrylic acid glycidyl esters, phthalic acid allyl-glycidyl ester-allyl - glycidyl ethers, 4 - vinyl - cyclohexene-mono epoxide, divinyl-benzene-mono epoxide or butadiene-mono epoxide. These monomers are copolymerized with other vinyl compounds, such as (meth)acrylic acid alkyl and aryl esters, styrene, α - methyl - styrene, acrylonitrile, vinyl chloride, vinyl acetate or vinyl propionate. It is also possible to copolymerize three or more different monomers of the above-cited kind, of which at least one monomer must contain an epoxy group. Copolymerization is carried out according to known methods in solvents, such as aromatic hydrocarbons, esters, ketones, alcohols and ethers having radical initiators, such as dibenzoyl peroxide, di-tert.-butyl peroxide or azo-isobutyronitrile, where required in the presence of chain-transfer agents, such as aliphatic mercaptans. The amount of monomer containing epoxy groups being incorporated in the copolymer advantageously ranges from 10 to 50% by weight of the total weight of the copolymer.

The molecular weights of the copolymers containing epoxy groups conveniently range from 10,000 to 80,000, so that they are soluble in the polar solvents used in the subsequent cross-linking reaction.

As cross-linking agents for the copolymers containing epoxy groups, there are mentioned organic di- and polycarboxylic acids, such as phthalic acid, isophthalic acid, terephthalic acid, trimellitic acid and organic carboxylic acid anhydrides, such as phthalic acid anhydride, hexahydrophthalic acid anhydride, succinic acid anhydride, hexachloroendomethylene - tetrahydrophthalic acid anhydride or trimellitic acid anhydride. Where required, unsaturated carboxylic acids and the anhydrides thereof, such as maleic acid and maleic acid anhydride, in admixture with saturated carboxylic acids and the anhydrides thereof may also be used.

For the preparation of the polyester resins of the invention the copolymers containing epoxy groups are mixed in polar solvents, such as monoalkyl-glycol esters, dimethyl-formamide, dimethyl-sulfoxide or dioxane, with the carboxylic acids or the anhydrides thereof and the mixture is cured at 150–200° C. for several hours under normal or reduced pressure, while the solvent is eliminated. It is advantageous to dissolve the desired amount of carboxylic acid or the anhydride thereof at 50–100° C. in an alkyl-glycol acetate solution containing 40 to 60% by weight of a copolymer containing epoxy groups. The amount of carboxylic acid or anhydride thereof added depends on the number of acid or anhydride groups and on the desired degree of hardness or brittleness of the resulting resin. The carboxylic acid or the anhydride thereof is generally employed in such an amount that there are two carboxylic acid groups or one anhydride group per epoxy group. The carboxylic acid or anhydride thereof may also be used in an excess or deficiency with regard to the epoxy group, thus varying the brittleness and hardness of the cross-linked products. The cross-linking reaction of the copolymers containing epoxy groups, with the carboxylic acids or anhydrides thereof may also be carried out in the presence of catalysts, such as tertiary amines, quarternary ammonium salts or boron trifluoride-amine complex compounds or of additives having a catalytic and, at the same time, modifying action, i.e. compounds having an active hydrogen atom, such as alcohols and mercaptans.

Both in the preparation of the copolymers containing epoxy groups, in the first step, and in the cross-linked polyester resins of the second step, the type and amount of the starting compounds used may vary greatly. Those skilled in the art are, however, very well able to choose such starting components in such mixing ratios that the polyester resins obtained have the properties required for the daylight fluorescent pigments.

The polyester resins thus obtained are distinguished by a good transparency, brightness and brittleness as well as by a satisfactory resistance toward organic solvents, oxygen and moisture. Moreover, they have a better thermostability and fastness to light than the resins known from U.S. Pats. Nos. 2,498,592, 2,809,954, 2,938,873, 3,116,256 and 3,412,036, from British Pats. Nos. 734,-181, 748,484, 792,616 and 1,048,983 and from German Pat. No. 961,575. These properties render the resins of the invention especially suitable for the application in daylight fluorescent pigments. Daylight flourescent pigments consist of a colorless finely ground base resin in which a fluorescent dyestuff has been incorporated. Such daylight fluorescent pigments are being used more and more in the lacquer, printing ink and plastic industry and in the field of textile materials and for the coating of paper.

As fluorescent dyestuffs there are considered organic compounds which are fluorescent by daylight in dissolved or solid, crystalline form, for example fluorescent dyestuffs of the rhodamine, sulfo-rhodamine or naphthalimide series. The dyestuffs disclosed in French Pats. Nos. 1,590,-506, 1,444,489, 1,488,112 and 1,470,793 may also be used.

For the production of the daylight fluorescent pigments according to the invention the fluorescent dyestuffs are incorporated in the polyester resins by dissolving or dispersing them in a solution containing the mixture of the copolymers containing epoxy groups and the carboxylic acids or anhydrides thereof, whereupon the mixture is cured in the manner mentioned above. The fluorescent dyestuffs may, however, also already be present in a dissolved or dispersed form in the solution containing the copolymer that contains epoxy groups, or they are used in a form chemically bound to the carboxylic acids or anhydrides thereof.

The cured product thus obtained is then converted into a finely divided form by dry or wet grinding in a ball or bead mill. Grinding is expediently carried out in the presence of water. The particle size of the daylight fluorescent pigment, which may vary within wide limits, depends to a large extent on the desired field of application. Thus, the average particle size of the daylight fluorescent pigment generally ranges between about 5 and 30 microns, if it is to be used for preparing printing inks for silk screen printing or for preparing lacquers, and between about 0.1 and 5 microns, if printing inks are to be prepared.

The concentration of the dyestuff in the resin depends above all on the type of the resin, on the dyestuff used and on the desired application of the daylight pigment. The dyestuff concentration generally ranges between about 0.1 and 10% by weight. The daylight pigment preferably contains the dyestuff in a concentration which provides the best possible brilliancy, the tinctorial strength of the product dyed with this dyestuff being good.

The daylight fluorescent pigments produced with the use of the condensed resins of the invention may be employed for preparing fluorescent paints, for example, air-drying lacquers on the basis of alkyd resins or physically drying lacquers on the basis of acrylic resins, as well as for preparing fluorescent printing inks, such as inks for screen printing, intaglio printing, book printing and offset-litho printing. Due to their high resistance to heat, they are especially suitable for fluorescent coloring of plastic material which are usually processed between 200° and 300° C., and enamels which are stoved above 150° C.

The following examples serve to illustrate the invention, the parts and percentages being by weight unless stated otherwise.

EXAMPLE 1

600 grams of ethyl glycol were heated to 140° C. At this temperature, a mixture of 360 g. of methyl-methacrylate, 240 g. of glycidyl methacrylate, 7.2 g. of di-tert.-butyl peroxide and 14.4 g. of tert.-dodecyl mercaptan was added in the course of 5 hours, and polymerization was continued for another hour. The reaction mixture had then reached a solids content of 49.2%. 100 parts of this acrylate resin solution were then mixed with 13 parts of phthalic acid anhydride at 120° C. and cured at 150° C. for 16.5 hours under greatly reduced pressure. The transparent brittle cured products were then ground to a fine powder. They were decomposed at 305–330° C. and were insoluble in heptane, xylene, ethanol, butanol, butyl acetate and acetone.

100 parts of the above acrylate resin solution, 13 parts of phthalic acid anhydride and 0.21 part of 10-methoxy-benzoxanthene-3,4-dicarboxylic acid hydrazine were mixed while stirring at 120° C. and cured at 150° C. for 16.5 hours under generally reduced pressure. An intensely greenish yellow fluorescent product was obtained, which could be ground in a ball or vibration mill to a fine powder. The daylight fluorescent pigment thus obtained was decomposed at 305–330° C. and was insoluble in heptane, xylene, ethanol, butanol, butyl acetate and acetone.

A polyester resin or daylight fluorescent pigment having the same good properties was obtained by replacing the phthalic acid anhydride indicated above by 14.5 parts of phthalic acid or 13.4 parts of tetrahydro-phthalic acid.

EXAMPLE 2

600 grams of ethyl-glycol acetate were heated to 140° C. and, at this temperature, a mixture of 360 g. of methyl-methacrylate, 240 g. of glycidyl acrylate, 7.2 g. of di-tert.-butyl peroxide and 14.4 g. of tert.-dodecyl mercaptan was added in the course of 5 hours. Polymerization took 2 hours. Then the solids content had reached a value of 48.2%. 100 parts of this acrylate resin solution were mixed at 120° C. with 13 parts of phthalic acid anhydride and cured at 150° C. for 16.5 hours under greatly reduced pressure. The transparent brittle cured products were ground to a fine powder which was decomposed at 310–330° C. and was insoluble in heptane, xylene, ethanol, butanol, butyl acetate and acetone.

When a mixture of 100 parts of the above acrylate resin solution, 13 parts of phthalic acid anhydride and 0.19 part of 10-methoxy-benzoxanthene-3,4-dicarboxylic acid hydrazide was cured at 150° C. for 16.5 hours under greatly reduced pressure, an intensely greenish yellow fluorescent product was obtained, which was ground in a ball mill to yield the daylight fluorescent pigment. It was decomposed at 310–330° C. and was insoluble in heptane, xylene, ethanol, butanol, butyl acetate and acetone.

Instead of 10-methoxy-benzoxanthene-3,4-dicarboxylic acid hydrazide, the following fluorescent dyestuffs may also be used (with mention of their fluorescent shades):

benzoxanthene-3,4-dicarboxylic acid imide (green),
benzoxanthene-3,4-dicarboxylic acid-N-3'-sulfamoyl-phenyl imide (green),
benzothioxanthene-3,4-dicarboxylic acid stearyl imide (greenish yellow),
benzothioxanthene-3,4-dicarboxylic acid hydrazide (greenish yellow),
4-amino-1,8-naphthal-2',4'-dimethyl-phenyl imide (green) or
7-oxo-14-thia-dibenzo(b,d,e,f)-chrysene (orange-yellow).

4 parts of the daylight fluorescent pigment obtained as above were mixed for 5 minutes at 160° C. on a twin-roller mixer with 90 parts of pulverized polyvinyl chloride containing 3% of an organic tin stabilizer and 1% of hydroxystearic acid. The resulting coat was stripped off and compression-molded for 5 minutes at 170° C. The compressed sheet obtained had an intensely greenish yellow fluorescent shade.

EXAMPLE 3

A mixture of 120 g. of methyl-methacrylate, 160 g. of glycidyl methacrylate, 120 g. of styrene, 4.8 g. of di-tert.-butylperoxide and 9.6 g. of tert.-dodecyl-mercaptan was added within 5 hours to 400 g. of ethyl-glycol acetate which had been heated to 140° C., polymerization was then continued for another 2 hours at 140° C. The solids content of the reaction mixture had then reached the value of 50.2%. 100 parts of this acrylate resin solution were mixed at 120° C. with 13 parts of phthalic acid anhydride and cured at 150° C. for 16.5 hours under greatly reduced pressure. The transparent brittle cured products obtained were ground to a fine powder. They were decomposed at 308–332° C. and were insoluble in heptane, xylene, ethanol, butanol, butyl acetate and acetone.

A mixture of 100 parts of the above acrylate resin solution, 13 parts of phthalic acid anhydride and 0.15 part of benzoxanthene-2,3-dicarboxylic acid hydroxy-ethyl-imide was cured at 150° C. for 16.5 hours under greatly reduced pressure. An intensely greenish yellow fluorescent cured product was obtained, which was ground in a ball mill to a fine powder. It was decomposed at 308–332° C. and was insoluble in heptane, xylene, ethanol, butanol, butyl acetate and acetone.

For the production of an enamel, 20 parts of the daylight fluorescent pigment obtained according to the above example were ground for 20 minutes on a paint shaker together with 45 parts of xylene, 25 parts of a 60% solution consisting of a nondrying alkyd resin having a low oil content, made from 37% of oil (triglyceride) and 40% of phthalic acid anhydride in xylene, and 10 parts of a 50% solution of a nonplasticized melamine resin, in alcohols and aromatic hydrocarbons in the presence of quartzite pearls (diameter 2 to 3 mm.) in a 200 ml. plastic beaker. The lacquer obtained was sprayed on white-coated test plates (30 x 30 cm.) and stoved for 20 minutes at 160° C. The resulting enamel had an intensely greenish yellow fluorescence.

EXAMPLE 4

A mixture of 120 g. of methyl-methacrylate, 120 g. of vinyl acetate, 160 g. of glycidyl methacrylate, 4.8 g. of azoisobutyronitrile and 9.6 g. of tert.-dodecyl-mercaptan was added within 5 hours to 400 g. of ethyl-glycol acetate which had been heated to a temperature of 70° C. The reaction mixture was then polymerized for another two hours at the same temperature and a copolymer solution having a solids content of 49.7% was obtained. This solution was worked up as disclosed in Example 1.

Vinyl acetate and glycidyl methacrylate used above may also be replaced by 120 g. of acrylonitrile and 160 g. of alkyl-glycidyl ether. In this case, a copolymer solution having a solids content of 49.5% was obtained and was also worked up as indicated in Example 1.

We claim:
1. A daylight fluorescent pigment consisting essentially of an organic fluorescent dyestuff and a cross-linked polyester resin consisting essentially of a copolymer of (a) an olefinically unsaturated compound containing epoxy groups and selected from the group consisting of a methacrylic acid glycidyl ester, phthalic acid allyl-glycidyl ester - allyl - glycidyl ethers, 4-vinyl-cyclohexene-mono epoxide, divinylbenzene-mono epoxide, and butadiene-mono epoxide and (b) vinyl compounds copolymerizable with compounds of group (a) and selected from the group consisting of methacrylic acid alkyl and aryl esters, styrene, α-methyl-styrene, acrylonitrile, vinylchloride, vinyl acetate and vinyl propionate and (c) cross-linking agents for the copolymers of (a) and (b) selected from the group consisting of an organic di- and polycarboxylic acid and an anhydride thereof, unsaturated carboxylic acid and an anhydride thereof and mixtures of same with saturated carboxylic acids and an anhydride thereof.

2. The pigment defined according to claim 1 and wherein the carboxylic acid or anhydride thereof is in an amount of two carboxylic groups or one anhydride group per one epoxy group of said copolymer of (a) and (b).

3. The pigment defined according to claim 1 and wherein the organic di- or polycarboxylic acid or an anhydride thereof is phthalic acid, isophthalic acid, terephthalic acid, trimellitic acid, phthalic acid anhydride, hexahydrophthalic acid anhydride, succinic acid anhydride, hexachloro-endomethylene-tetrahydrophthalic acid anhydride or trimellitic acid anhydride.

4. The pigment defined according to claim 1 and wherein the unsaturated carboxylic acid and the anhydride thereof is maleic acid and maleic acid anhydride.

5. The pigment defined according to claim 1 and wherein the molecular weight of the copolymer of (a) and (b) is from 10,000 to 80,000.

6. The pigment defined according to claim 1 and wherein the monomer containing the epoxy group is from 10% to 50% by weight of the copolymer of (a) and (b).

7. The pigment defined according to claim 1 and wherein the fluorescent dye is of the benzoxanthene or benzothioxanthene series.

References Cited
UNITED STATES PATENTS

| | | | |
|---|---|---|---|
| 2,938,873 | 5/1960 | Kazenas | 252—301.2 R |
| 3,412,036 | 11/1968 | McIntosh | 252—301.2 R |
| 3,506,736 | 4/1970 | Najvar | 260—78.4 EP |
| 3,541,055 | 11/1970 | Malamet | 260—78.4 EP |
| 3,557,246 | 1/1971 | Foster | 260—78.4 EP |
| 3,564,074 | 2/1971 | Swisher et al. | 260—78.4 EP |
| 3,634,542 | 1/1972 | Dowd | 260—78.4 EP |
| 3,657,196 | 4/1972 | Foster | 260—78.4 EP |

DANIEL E. WYMAN, Primary Examiner

A. P. DEMERS, Assistant Examiner

U.S. Cl. X.R.

106—22, 288 Q; 260—23 EP, 41 C, 78.4 EP